United States Patent Office 2,696,106
Patented Dec. 7, 1954

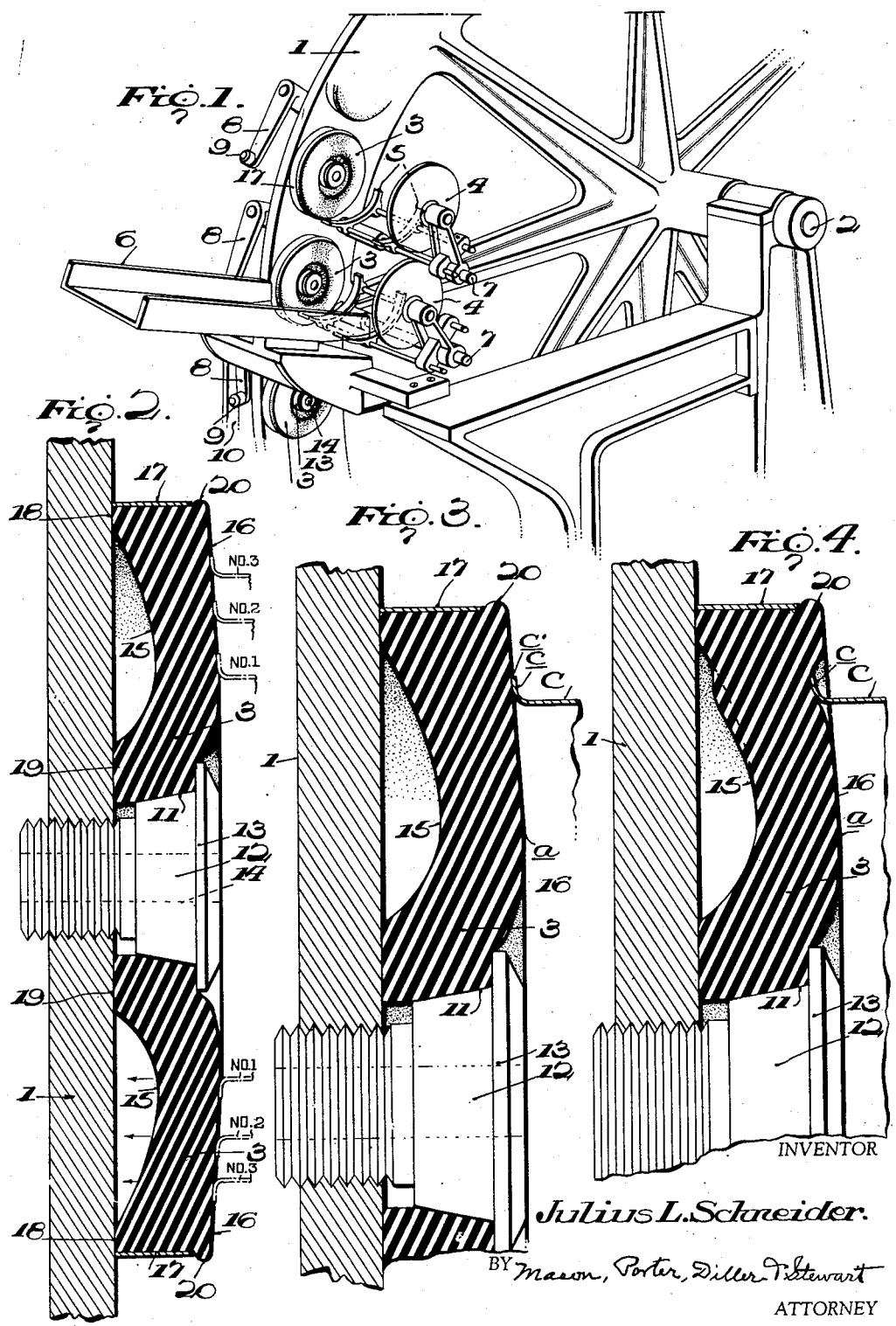

2,696,106

MACHINE FOR TESTING OPEN-TOP CANS FOR LEAKS

Julius L. Schneider, Chicago, Ill., assignor to Continental Can Company, Inc., New York, N. Y., a corporation of New York Application July 10, 1952, Serial No. 298,093

2 Claims. (Cl. 73—40)

The invention relates to new and useful improvements in a testing unit for testing open end flanged cans for leaks and more particularly to the construction of the pad used for sealing the open end of the can during the testing thereof.

An object of the invention is to provide a pad which is arch shaped on its inner face and on its outer face radially flat and inclined so as to conform in general to the flat contacting face of the flange of the can being tested.

A further object of the invention is to provide a pad of the above type with a metal band surrounding the periphery of said pad and dimensioned so as to maintain a radially compressive force on the contacting surface of said pad when the can is pressed against the same for testing.

A still further object of the invention is to provide a pad of the above type wherein the flat radial surface of the outer face of the pad is of sufficient radial length so that cans of different diameters can be tested on the same pad.

Another object of the invention is to provide a pad of the above type wherein the thickness of the pad gradually decreases from the outer side of the flange contacting portion of the pad to the inner side thereof so that can flanges of different dimensions will be embedded in the pad to same degree by the same pressure against the can and a tight seal obtained to withstand the testing pressure against varying areas of the pad.

These and other objects will in part be obvious and will in part be hereinafter more fully disclosed.

In the drawings, which show by way of illustration one embodiment of the invention:

Figure 1 is a perspective view showing a portion of a testing machine with the improved testing units applied thereto;

Figure 2 is an enlarged sectional view diametrically through the improved sealing pad and a supporting plate therefor;

Figure 3 is an enlarged view of a portion of the pad and plate showing the can flange as initially contacting the pad; and Figure 4 is a view similar to Figure 3 but showing the can placed under pressure for imbedding the flange in the pad to produce a tight seal.

The invention has to do with a machine for testing open top cans, preferably metal cans, for leaks. The open top can, as completed by the manufacturer ready for use, includes a cylindrical body to which a bottom end is secured by double seaming and the open end is flanged outwardly preparatory to receiving the closure and after the product has been filled into the can. The present invention is particularly adapted for use in a testing machine such as disclosed in the patent to Meyer No. 1,941,043, granted December 26, 1933.

The testing machine disclosed in the Meyer patent includes a supporting wheel mounted for rotation about the horizontal axis. On the rotating wheel is a series of testing units. Each unit includes a can support on which the cans one after another are placed for testing. Each testing unit also includes a sealing pad of rubber like resilience against which the flanged end of the open top can is pressed until the flange is imbedded in the rubber pad so as to completely seal the chamber within the can. The can is pressed and clamped against the pad by a pressure plate which engages the bottom of the can and is moved toward the pad a sufficient distance to bring about tight sealing of the can.

In this Meyer machine the pad for sealing the can is in the form of a flat rubber disk having an opening centrally thereof to receive a stud which holds the pad against the face of the testing wheel. In order that the can will be tightly sealed the flange of the can is pressed against the pad until it becomes imbedded therein and this is accomplished solely by deforming the pad after which the can is securely clamped against the pad by a toggle mechanism.

The present improvement is directed to the construction and shaping of the rubber pad against which the flanged open end of the can is clamped under pressure.

Figure 1 of the drawings shows a portion of a testing machine which includes a wheel 1 mounted for rotation about a horizontal axis indicated at 2. Mounted on the flat perimeter portion of the wheel are the testing units. Each testing unit includes the rubber pad against which the flanged end c of the can C is pressed for closing the can. The can is pressed against the pad by a bottom plate 4 which is mounted for reciprocation toward and from the pad. This bottom plate engages the bottom or closed end of the can and forces the open top or flanged end of the can against the pad until it is imbedded therein and makes tight sealed contact therewith. Associated with each can testing unit is a can support 5. The cans pass down a runway 6 and are placed one after another on the can support associated with the testing unit. The plate 4 which engages the bottom of the can is mounted on a rod 7 which extends through the wheel and this rod supporting the plate is moved endwise by a toggle mechanism controlled by a crank arm 8. This crank arm carries a roller 9 which cooperates with a cam track 10 to bring about the movements of the plate and the clamping of the can against the pad. The specific mechanism for actuating the bottom plate for clamping the can against the pad is shown only diagrammatically and fragmentarily in this Figure 1. It is shown in detail in the patent to Meyer and is a very common type testing machine.

The improvements in the testing units resides in the construction of the pad against which the cam body is clamped. As shown in Figure 1 the pad 3 is annular in shape, this providing a central opening 11 through which a retaining stud 12 passes. Said stud has a tapered head which is dimensioned so as to engage the wall of the central opening through the pad and this provides a support for the pad which applies an outwardly compressive force in a radial direction of the pad. The stud is provided with a projecting flange 13 at its outer end which overlies and firmly clamps the pad against the wheel. This stud has an opening 14 therethrough. It serves as a passage for air for testing purposes. The pad on its inner face has a flat annular peripheral surface 18 and also a flat annular surface 19 surrounding the opening through the pad. These flat surfaces of the pad contact the supporting plate 1. The pad on its inner face between the peripheral portion 18 and the annular portion 19 is arch shaped as indicated at 15. This arch shaped portion 15 is spaced away from the support so that the pad between the supporting surfaces 18 and 19 is only supported by the resiliency of a material constituting the pad.

The open top can includes a cylindrical body and extending outwardly at the open end of the can is a flange c' which is of the usual construction so the cover member can be joined to the body by double seaming the cover flange and the can body flange together. This flange c' joins the body by a curved portion. The outer portion of the flange, however, is substantially flat on its outer face and inclined slightly outwardly away from the body of the can. The edge of the flange c' is formed by cutting the metal and, therefore, it is what might be called a raw edge.

The outer face of the pad 3, from the line a—a, radially outwardly therefrom, is substantially flat and inclines so as to conform generally to the flat outer face of the flange. When the surface of the pad contacted with by the flange is shaped to conform substantially to the angle of the flange then when pressure is applied the flange will become imbedded in the pad with little or no cutting of the pad by the raw edge of the metal at the end c' of the flange.

In Figure 3 the can flange is shown in its initial contact with the pad and in Figure 4, it is shown imbedded therein.

Surrounding the pad is a metal band 17 which band is preferably of smaller diameter than the initial diameter of the pad so that when the band is forced onto the pad there will be a slight compressive force applied to the pad. Furthermore, when the can is pressed against the pad this band will prevent the expansion of the pad outwardly and the plug 12 will prevent the contraction of the pad inwardly and, therefore, the surface of the pad will be put under slight compression and this aids in preventing the flange from cutting the pad so as to produce a roughened surface requiring that the pressure applied to the pad should be increased in order to get a seal and also shortening the life of the pad.

In Figure 2 of the drawing there is shown the placing of cans of different diameters against the pad for sealing the same. While the drawings are not to scale, let us assume that the can nearest the center of the pad is the No. 1 can and the next larger can is the No. 2 can and the largest can the No. 3 can. The flat surface of the pad extends radially from a line well within the surface area where can No. 1 contacts with the pad and its flat surface extends outwardly beyond the area where the flat surface of the flange of the No. 3 can contacts with the pad. By the present shaping of the pad so as to provide this flat radial surface conforming to the flange of a can the testing unit without any adjustment may be used to test cans of different diameters.

The arch surface at the inner side of the pad is so shaped that the thickness of the pad gradually decreases from a line outside of the flat surface with which the can flange contacts to a line within the area contacted with by the smallest can. Therefore, the resiliency of the pad is lesser for the large size can than the resilience of the pad in the region contacted with by the flange of the smallest can. The flange area of the smallest can is much less than the flange area of the largest can, but this variation in the resilience enables the flanges of the various size cans to be imbedded in the rubber pad to provide a tight seal by the application of the same pressure force for each can. This also aids in the testing of cans of different diameters on the same testing unit without changing the pad or the pressure means forcing the can against the pad.

The surface upon which these cans of different sizes contact is as noted substantially flat and inclined slightly toward the periphery of the pad to conform to the angle of the outer flat face of the flange. The arch shaped inner surface of the pad is so dimensioned that the pad decreases in thickness toward the center of the pad and, therefore, all sizes of cans would be imbedded substantially the same distance into the rubber to make a seal for testing the same. The testing is accomplished by admitting air under pressure to the interior of the can. The large No. 3 size flange area will meet with more resistance because of the decrease in the thickness of the pad. In other words, it will be pressed the same distance into the rubber as the smaller diameter can and has the same sealing efficiency despite the fact that the testing air pressure acts upon a much larger pad area inside the can and thus the contact between the can flange and the rubber must be tighter with the larger can to make a comparable seal with the smaller can, as the pad at the contact of the smaller can flange is thinner and more flexible than the larger can.

For reasons stated above, the improved pad is of a universal type in which all size cans are compensated for so that all other conditions of testing such as seal, can pressure and air pressure are equal.

It is noted that the pad has a projecting bead 20 on its periphery at the outer side thereof. This bead is for the purpose of retaining the band 17 in engagement with the peripheral surface of the pad.

It is obvious that changes may be made in the details of construction and the shaping of the pad without departing from the spirit of the invention as set forth in the appended claims.

I claim:

1. A testing unit for testing open-ended cans having a seaming flange comprising a support, a sealing pad of rubber-like resilience secured to said support and pressure means for urging a flanged open-ended can into sealing engagement with said pad, said pad being of annular shape and having on its inner face an annular peripheral portion and an annular central portion contacting the support, said pad between said supporting portions being arch shaped and spaced away from said support, said pad on its outer face in the region contacted by the cans during testing being radially substantially flat and inclined to conform to the outer flat face of the can flange a headed stud passing through the central opening of the annular pad for securing said pad to said support, said stud having a tapered shank slightly larger than the opening in the pad for maintaining an outwardly compressive force in a radial direction on the pad, and means for engaging the periphery of said pad for maintaining an inwardly compressive force radially on said pad and preventing radial expansion thereof.

2. A testing unit for testing open-ended cans having a seaming flange comprising a support, a sealing pad of rubber-like resilience secured to said support and pressure means for urging a flanged open-ended can into sealing engagement with said pad, said pad being of annular shape and having on its inner face an annular peripheral portion and an annular central portion contacting the support, said pad between said supporting portions being arch shaped and spaced away from said support, said pad on its outer face in the region contacted by the cans during testing being radially substantially flat and inclined to conform to the outer flat face of the can flange, a metal band of smaller diameter than the initial diameter of the pad engaging the periphery of said pad for maintaining an inwardly compressive radial force on the pad and preventing radial expansion thereof, said band being of less width than the width of the peripheral surface of the pad and said pad having a projecting peripheral bead for preventing said band from working off from the pad.

References Cited in the file of this patent

UNITED STATES PATENTS

| Number | Name | Date |
|---|---|---|
| 1,606,486 | Stevens | Nov. 9, 1926 |
| 1,941,043 | Meyer | Dec. 26, 1933 |
| 2,086,116 | Burns | July 6, 1937 |
| 2,646,677 | Kubaugh | July 28, 1953 |